US008124159B2

(12) United States Patent
Oh

(10) Patent No.: US 8,124,159 B2
(45) Date of Patent: Feb. 28, 2012

(54) METHOD OF MAKING BEAN CURD USING RICE

(76) Inventor: Kyung Sik Oh, JeonJoo-si (KR)

( * ) Notice: Subject to any disclaimer, the term of this patent is extended or adjusted under 35 U.S.C. 154(b) by 401 days.

(21) Appl. No.: 12/560,537

(22) Filed: Sep. 16, 2009

(65) Prior Publication Data

US 2010/0316779 A1 Dec. 16, 2010

(30) Foreign Application Priority Data

Jun. 10, 2009 (KR) .......................... 10-2009-0051379

(51) Int. Cl.
*A23P 1/00* (2006.01)
(52) U.S. Cl. ........................................ 426/634; 426/329
(58) Field of Classification Search .................. 426/634, 426/329
See application file for complete search history.

(56) References Cited

FOREIGN PATENT DOCUMENTS

| JP | 2002017277 | * | 1/2002 |
| JP | 2006238819 | * | 9/2006 |

OTHER PUBLICATIONS

Derwent Database Abstract for KR 810582, published Jun. 2008.*
Derwent Database Abstract for JP2002017277, published Jan. 22, 2002.*
Derwent Database Abstract for JP 2006238819, published Sep. 14, 2006.*

* cited by examiner

*Primary Examiner* — Anthony Weier
(74) *Attorney, Agent, or Firm* — Lexyoume IP Group, PLLC

(57) ABSTRACT

The present invention relates to a method of making bean curd using rice in which 65-70 wt % of soya beans and 30-35 wt % of parched rice in about a total weight of 5 kg for one block of bean curd are soaked, and in which the soya beans are soaked for about 8-12 hours and the parched rice is soaked for about 2 hours in water. The soya beans and parched rice are then mixed and ground into a powder with the addition of 15 g of a defoaming agent and 60 g of water. Bean curd refuse is filtered by passing the mixture through a filter, and then the remaining parched rice/soya bean milk is boiled at 80-99° C. Water and 42 g of magnesium chloride added to the heated parched rice/bean curd milk, 14 g of salt or JukYum (salt roasted in bamboo) is added and the mixture is coagulated. The coagulated mixture is then mashed to a diameter or 3-4 cm and then pressed. Accordingly, consumers' health can be improved by the bean curd containing rice, and it is possible to satisfy various tastes of the consumers by providing high-quality bean curd.

4 Claims, 1 Drawing Sheet

METHOD OF MAKING BEAN CURD USING RICE

CROSS-REFERENCE TO RELATED APPLICATION

This application claims priority to and the benefit of Korean Patent Application No. 10-2009-0051379 filed in the Korean Intellectual Property Office on Jun. 10, 2009, the entire contents of which are incorporated herein by reference.

BACKGROUND OF THE INVENTION (a) Field of the Invention

The present invention relates to a method of making bean curd. In particular, the present invention relates to a method of making bean curd using rice which can satisfy various tastes of consumers by pulverizing and adding parched rice or adding concentrate of parched rice in a process of making bean curd.

(b) Description of the Related Art

In general, bean curd is food made from only soya beans, and according to a traditional method, bean curd is made by a process of sufficiently soaking soya beans, grinding the soaked soya beans with a millstone or a mixer and filtering the grounds, sufficiently boiling the filtered soya bean milk, adding a predetermined amount of salt water to the boiled soya bean milk, and mixing them.

Bean curd made as described above is classified and sold as uncurdled bean curd, soft bean curd, and normal bean curd, in accordance with the degree of coagulation, such that consumers can prepare a variety of foods using the bean curd.

Meanwhile, efforts for making the taste and smell of bean curd various have been made in recent years, and a wide selection has been provided for consumers by putting in various additives that suit the consumers' taste, in addition to making bean curd only using soya beans.

As the additives putted in bean curd, wormwood, fruit juice, meat juice, shellfish juice, leaks, garlic, ginger juice, anchovies, vegetables, shrimp, blue crab, mushroom, pepper, etc., are used.

However, making bean curd with the additives may make consumers uneasy, due to the smell of the additives.

Further, consumers increasingly have an interest in health, and it is difficult to find bean curd corresponding to this interest.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to remove defects of bean curd in the related art by providing a method of making bean curd using rice having advantages of improving consumers' health and satisfying various tastes of the consumers, by adding parched rice after mashing or parched rice concentrate in a procedure of making bean curd.

According to the present invention, 65-70 wt % of soya beans and 30-35 wt % of parched rice in about a total weight of 5 kg for one block of bean curd are soaked, and in which the soya beans are soaked for about 8-12 hours and the parched rice is soaked for about 2 hours in water.

The soya beans and parched rice are mixed and the mixture is put into a mill to grind it into powder, and then 15 g of a defoaming agent that suppresses foaming and 60 g of water are added to the mixture of ground soya beans and parched rice and they are mixed evenly.

Bean curd refuse is filtered by passing the mixture through a filter, and the remaining parched rice/soya bean milk is then boiled at 80-99° C.

42 g of magnesium chloride, which is a coagulant, is added to the heated parched rice/bean curd milk, 14 g of salt or JukYum (salt roasted in bamboo) is added together with 45 g of water, and they are mixed and coagulated.

The coagulated parched rice/bean curd milk is mashed to have a diameter of 3-4 cm and then the mashed rice-bean curd is pressed, such that bean curd using rice is completed.

Further, the parched rice is obtained by parching any one of brown rice, wild rice, and white rice.

In addition, any one of 600 g of parched rice powder or 600 g of parched rice concentrate is added in any one of the filtering and boiling process, the coagulating process, and the mashing process.

According to the method of making bean curd using rice of the present invention, consumers' health can be improved by the bean curd containing rice, it is possible to satisfy various tastes of consumers by providing high-quality bean curd, and it is also possible to help farmers in needy circumstances by increasing consumption of rice.

BRIEF DESCRIPTION OF THE DRAWINGS

FIG. 1 is a flowchart illustrating a process of making bean curd using rice according to the present invention.

DETAILED DESCRIPTION OF THE EMBODIMENTS

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

Terminologies used herein are provided to just mention specific exemplary embodiments and are not intended to limit the present invention. Singular expressions used herein include plurals unless they have definitely opposite meanings. The meaning of "including" used in this specification gives shape to specific characteristics, regions, positive numbers, steps, operations, elements, and/or component, and do not exclude existence or addition of other specific characteristics, regions, positive numbers, steps, operations, elements, components, and/or groups.

If not defined differently, all the terminologies including technical terms and scientific terms used herein have the same meanings as those skilled in the art generally understand. Terms defined in common dictionaries are construed to have meanings corresponding to related technical documents and the present description, and they are not construed as ideal or overly official meanings, if not defined.

Exemplary embodiments of the present invention described with reference to perspective views represent ideal exemplary embodiments of the present invention in detail. Therefore, various modification of diagrams, for example modifications of manufacturing methods and/or specifications, are expected. Accordingly, exemplary embodiments are not limited to specific shapes of shown regions, and for example, also include modifications of the shape by manufacturing. For example, regions shown or described as flat may generally have rough or rough and nonlinear characteristics. Further, portions shown to have sharp angles may be rounded. Therefore, the regions shown in the drawings are basically just schematic and the shapes of those are not intended to show the exact shapes of the region and are also not intended to reduce the scope of the present invention.

Describing a process of making bean curd using rice according to the present invention with reference to FIG. 1, 65-70 wt % of soya beans and 30-35 wt % of parched rice in about a total weight of 5 kg for one block of bean curd are soaked, in which the soya beans are soaked for about 8-12 hours and the parched rice is soaked for about 2 hours.

The mixture of the soaked soya beans and parched rice is put into a mill to grind it into fine powder, and then 15 g of a defoaming agent that suppresses foaming and 60 g of water are added thereto and agitated evenly in the mixture of ground soya beans and parched rice.

Bean curd refuse is filtered by passing the material mixed as described above through a filter, and then the remaining parched rice/soya bean milk are boiled at 80-99° C.

In addition to 42 g of magnesium chloride, which is a coagulant, 14 g of salt or JukYum (salt roasted in bamboo) and 45 g of water are added and mixed in the heated parched rice/soya bean milk, which is left to be coagulated.

The coagulated parched rice/soya bean milk is mashed to have a diameter of about 3-4 cm, and then bean curd made from rice is achieved by pressing the mashed rice-bean curd.

A characteristic of the bean curd made by the above procedure is to contain rice, that is, the characteristic is to be manufactured by grinding the soaked soya bean and parched rice into a fine powder, mixing it with a defoaming agent, and filtering it, and then adding magnesium chloride to the filtered parched rice/soya bean milk and coagulating it.

Further, the parched rice used in the procedure of making bean curd is obtained by parching any one of brown rice, wild rice, and white rice.

Further, it is possible to add any one of 600 g of fine parched rice powder or 600 g of parched rice concentrate, instead of the parched rice, when making the bean curd. Accordingly, there is another characteristic in that a predetermined amount of parched rice powder or parched rice concentrate is added in any one process in the filtering, boiling, coagulating, and mashing processes, which are included in the process of making bean curd.

The procedure for making bean curd containing rice as described above is described in detail for each process as follows.

Soya Beans and Parched Rice Soaking Process: a process of soaking 65-70 wt % of soya beans and 30-35 wt % of parched rice in about a total weight of 5 kg for one block of bean curd, in which the soya beans are soaked for about 8-12 hours and the parched rice is soaked for about 2 hours in water.

Grinding Process: a process of mixing the soya beans and parched rice soaked by the process of soaking and then putting the mixture into a mill to grind it into powder.

Mixing Process: a process of adding 15 g of a defoaming agent that suppresses foaming and 60 g of water into the mixture of ground soya beans and parched rice and mixing them evenly, in which, in particular, the defoaming agent is a kind of food additive that suppresses foaming during mixing.

Filtering and Boiling Process: a process of filtering bean curd refuse by passing the mixture through a filter and then boiling the remaining parched rice/soya bean milk at about 80-99° C.

Coagulating Process: a process of adding 42 g of magnesium chloride, which is a coagulant, to the heated parched rice/bean curd milk, adding any one of 14 g of salt or JukYum, adding 45 g of water, and mixing and coagulating them.

Mashing Process: a process of mashing the coagulated parched rice/bean curd milk to have a diameter of about 3-4 cm.

Pressing Process: a process of pouring the rice-bean curd mashed by the mashing process into a bean curd block and then pressing it in a bean curd shape with a press machine.

The amount of additives that are added to the bean curd made as described above is for a block of bean curd (5 kg), that is, it is a ratio of the rice-bean curd containing 65-70 wt % of soya beans and 30-35 wt % of parched rice.

The parched rice used in the rice-bean curd is obtained by parching brown rice, wild rice, or common rice, in which the rice-bean curd has various tastes and colors in accordance with the kind of the parched rice.

Further, when any one of 600 g of parched rice powder and 600 g of parched rice concentrate (60% or more concentrated) is added in the procedure of making the bean curd, it is added in any one of the filtering and boiling process, the coagulating process, and the mashing process, in accordance with the plainness or strength of taste, and it is preferable to put in the parched rice powder or the parched rice concentrate while performing the mashing process.

Accordingly, it is possible to provide bean curd having a particular taste and smell for consumers by adding parched rice in the bean curd in the optimum state, as described above.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of making bean curd using rice, comprising sequentially performing:

a soya bean and parched rice soaking process of soaking 65-70 wt % of soya beans and 30-35 wt % of parched rice in about a total weight of 5 kg for one block of bean curd, in which the soya beans are soaked for about 8-12 hours and the parched rice is soaked for about 2 hours in water;

a grinding process of mixing the soya beans and parched rice and then putting the mixture in a mill to grind it into powder;

a mixing process of adding 15 g of a defoaming agent that suppresses foaming and 60 g of water into the mixture of ground soya beans and parched rice and mixing them evenly;

a filtering and boiling process of filtering bean curd refuse by passing the mixture through a filter and then boiling the remaining parched rice/soya bean milk at 80-99° C.;

a coagulating process of adding 42 g of magnesium chloride, which is a coagulant, to the heated parched rice/bean curd milk, adding 14 g of salt or JukYum (salt roasted in bamboo) with 45 g of water, and mixing and coagulating them;

a mashing process of mashing the coagulated parched rice/bean curd milk to have a diameter of about 3-4 cm; and a pressing process of pouring the mashed rice-bean curd into a bean curd block and then pressing the rice-bean curd in a bean curd shape with a press machine.

2. The method of making bean curd using rice of claim 1, wherein the parched rice is obtained by parching any one of brown rice, wild rice, and white rice.

3. The method of making bean curd using rice of claim 1, wherein any one of 600 g of parched rice powder or 600 g of parched rice concentrate is added in any one of the filtering and boiling process, the coagulating process, and the mashing process.

4. The method of making bean curd using rice of claim 2, wherein any one of 600 g of parched rice powder or 600 g of parched rice concentrate is added in any one of the filtering and boiling process, the coagulating process, and the mashing process.

\* \* \* \* \*